United States Patent [19]

Moriyama

[11] Patent Number: 4,851,999

[45] Date of Patent: Jul. 25, 1989

[54] GENERAL-PURPOSE MANAGEMENT SYSTEM

[75] Inventor: Teruko Moriyama, 297-1 Kasuyama, Kurashiki-shi, Okayama-ken, Japan

[73] Assignees: Teruko Moriyama; Sohei Yamamoto, both of Japan

[21] Appl. No.: 888,399

[22] Filed: Jul. 23, 1986

[30] Foreign Application Priority Data

Jul. 24, 1985 [JP] Japan ................................. 60-162033

[51] Int. Cl.⁴ ........................ G06F 15/21; G06F 15/22
[52] U.S. Cl. .................................... 364/401; 364/900; 364/400
[58] Field of Search ... 364/200 MS File, 900 MS File, 364/400, 401, 300, 200, 405

[56] References Cited

U.S. PATENT DOCUMENTS

| | | | |
|---|---|---|---|
| 4,153,931 | 5/1979 | Green et al. | 364/200 |
| 4,383,298 | 5/1983 | Huff et al. | 364/200 |
| 4,459,663 | 7/1984 | Dye | 364/200 |

OTHER PUBLICATIONS

"Form Management" by D. Tsichritzis, 8070 Communications of the Association for Computing Machinery, vol. 25 (1982), Jul., No. 7, New York USA, pp. 453–478.
"OPAS: An Office Procedure Automation System" by V. Y. Lum, D. M. Choy and N. C. Shu, 8204 IBM Systems Journal, vol. 21 (1982), No. 3, New York, USA, pp. 327–350.

*Primary Examiner*—Jerry Smith
*Assistant Examiner*—Charles B. Meyer
*Attorney, Agent, or Firm*—Lowe, Price, LeBlanc, Becker & Shur

[57] ABSTRACT

A general-purpose management system displays a single general format on a display unit so that items redundant in plural types of management to be performed independently, as well as items peculiar to each type of management, can be inputted successively, and includes a first file for collectively storing data relating to each of the items inputted in accordance with the display, a plurality of second files for storing data necessary for each type of management on a type-by-type basis, a data extractor which, in dependence upon the type of management to be performed independently, is adapted to extract data necessary for this management from the first file and transfer the data to a corresponding second file, and a data preparer for preparing data necessary for a specific type of management and outputting these data in accordance with a predetermined format on the basis of the data in the first file and the data transferred to the corresponding second file.

6 Claims, 16 Drawing Sheets

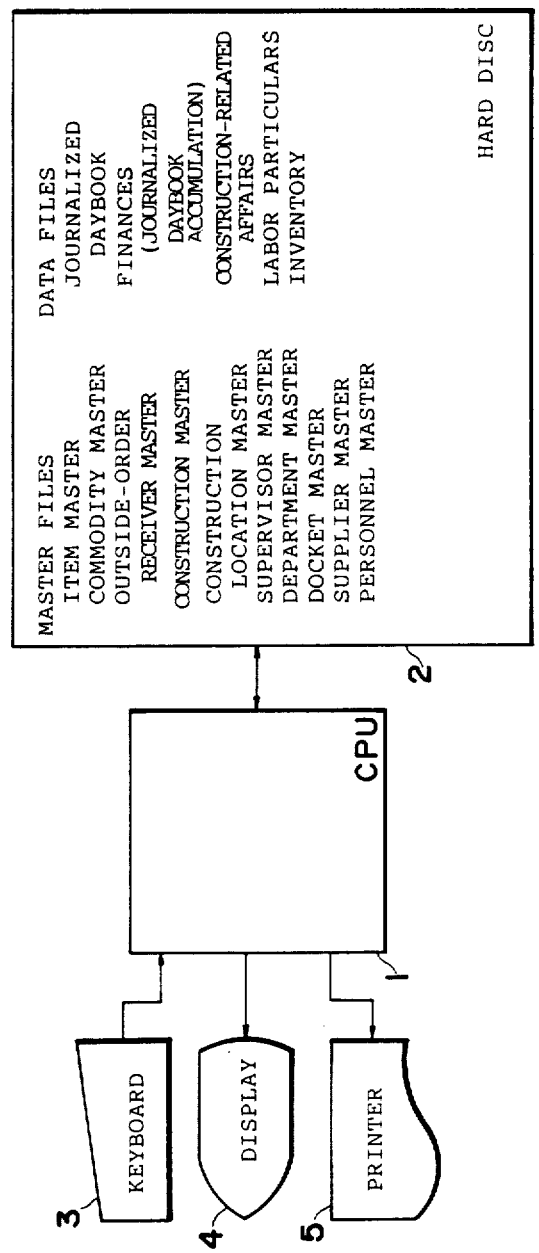

Fig. 2

TRANSFER SLIP INPUT

PROCESSING DATE:   DAY:   MONTH:   YEAR:

| DEBIT ITEM CODE | AUXILIARY CODE | DEBIT ITEM NAME | DEBIT AMOUNT | DOCKET | CREDIT CODE | CREDIT ITEM NAME | AUXILIARY CODE | CREDIT ITEM NAME | DEBIT AMOUNT |
|---|---|---|---|---|---|---|---|---|---|
|  |  |  |  |  |  |  |  |  |  |

DOCKET ITEMS

| CONSTRUCTION NUMBER | CONSTRUCTION NAME |
| CONSTRUCTION LOCATION CODE | CONSTRUCTION LOCATION |
| SUPERVISOR CODE | SUPERVISOR NAME |
| DIVISION CODE | DIVISION NAME |
| DEPARTMENT CODE | DEPARTMENT NAME |
| EXPECTED PAYMENT DATE | DAY:   MONTH:   YEAR: |
| DUE DATE OF BILL RECEIVABLE | DAY:   MONTH:   YEAR: |
| DUE DATE OF BILL OF PAYMENT | DAY:   MONTH:   YEAR: |

| COMMODITY CODE | ITEM NAME | QUANTITY | UNITS | UNIT PRICE | AMOUNT |
|---|---|---|---|---|---|
|  |  |  |  |  |  |
|  |  |  |  |  |  |
|  |  |  |  | TOTAL |  |
|  |  |  |  |  |  |

Fig. 3a

| | |
|---|---|
| ITEM CODE | COMMODITY CODE |
| ITEM NAME | COMMODITY NAME |
| DEBIT/CREDIT DIVISION | SPECIFICATIONS |
| TOTALS DIVISION | DIMENSIONS |
| AMOUNT CARRIED OVER FROM LAST ACCOUNT (BEGINNING BALANCE) | UNITS |
| CURRENT MONTH DEBIT AMOUNT (JANUARY - DECEMBER) | COST PRICE |
| CURRENT MONTH CREDIT AMOUNT (JANUARY - DECEMBER) | LIST PRICE |
| STARTING ADDRESS | PRECEDING MONTH TOTAL STOCK |
| END ADDRESS | PRESENT MONTH QUANTITY OF COMMODITIES RECEIVED (12 MONTHS) |
| ITEM CODE | PRESENT MONTH QUANTITY OF COMMODITIES DELIVERED (12 MONTHS) |
| ITEM NAME | STARTING ADDRESS |
| DEBIT/CREDIT DIVISION | END ADDRESS |
| TOTALS DIVISION | COMMODITY CODE |
| AMOUNT CARRIED OVER FROM LAST ACCOUNT (BEGINNING BALANCE) | COMMODITY NAME |
| CURRENT MONTH DEBIT AMOUNT (JANUARY - DECEMBER) | SPECIFICATIONS |
| CURRENT MONTH CREDIT AMOUNT (JANUARY - DECEMBER) | DIMENSIONS |
| STARTING ADDRESS | UNITS |
| END ADDRESS | COST PRICE |
| ITEM CODE | LIST PRICE |
| ITEM NAME | PRECEDING MONTH TOTAL STOCK |
| DEBIT/CREDIT DIVISION | PRESENT MONTH QUANTITY OF COMMODITIES RECEIVED (12 MONTHS) |
| | PRESENT MONTH QUANTITY OF COMMODITIES DELIVERED (12 MONTHS) |
| | STARTING ADDRESS |
| | END ADDRESS |
| | COMMODITY CODE |
| | COMMODITY NAME |

Fig.3b
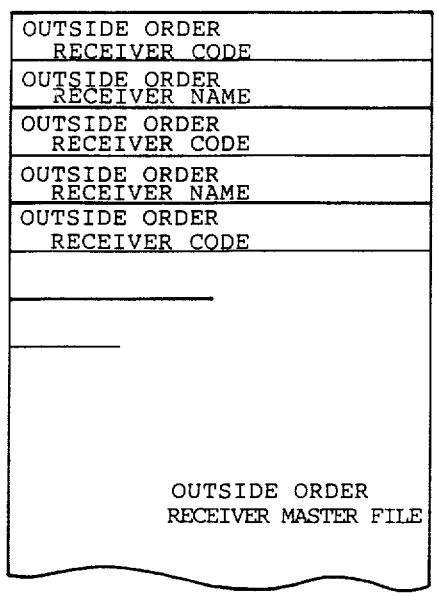
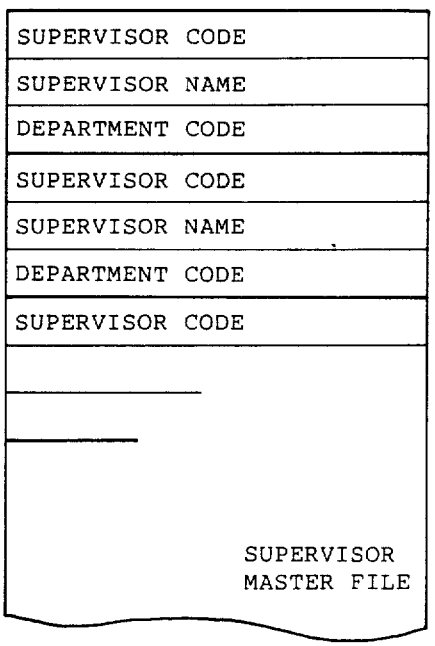

Fig.4a

| |
|---|
| PROCESSING DATE |
| DEBIT ITEM CODE |
| DEBIT AUXILIARY CODE |
| DEBIT AMOUNT |
| DOCKET |
| CREDIT ITEM CODE |
| CREDIT AUXILIARY CODE |
| DEBIT AMOUNT |
| CONSTRUCTION NUMBER |
| CONSTRUCTION LOCATION CODE |
| SUPERVISOR CODE |
| DIVISION CODE |
| DEPARTMENT CODE |
| EXPECTED PAYMENT DATE |
| DUE DATE OF BILL RECEIVABLE |
| DUE DATE OF BILL OF PAYMENT |
| COMMODITY CODE (x4) |
| QUANTITY (x4) |
| UNITS (x4) |
| UNIT PRICE (x4) |
| AMOUNT (x4) |
| PROCESSING DATE |
| DEBIT ITEM CODE |
| DEBIT AUXILIARY CODE |
| DEBIT AMOUNT |
| DOCKET |

JOURNALIZED DAYBOOK FILE

| |
|---|
| PROCESSING DATE |
| DEBIT ITEM CODE |
| DEBIT AUXILIARY CODE |
| DEBIT AMOUNT |
| DOCKET |
| CREDIT ITEM CODE |
| CREDIT AUXILIARY CODE |
| CREDIT AMOUNT |
| DEBIT ITEM CHAIN |
| DEBIT AUXILIARY CHAIN |
| CREDIT ITEM CHAIN |
| CREDIT AUXILIARY CHAIN |
| PROCESSING DATE |
| DEBIT ITEM CODE |
| DEBIT AUXILIARY CODE |
| DEBIT AMOUNT |
| DOCKET |
| CREDIT ITEM CODE |

JOURNALIZED DAYBOOK ACCUMULATION FILE

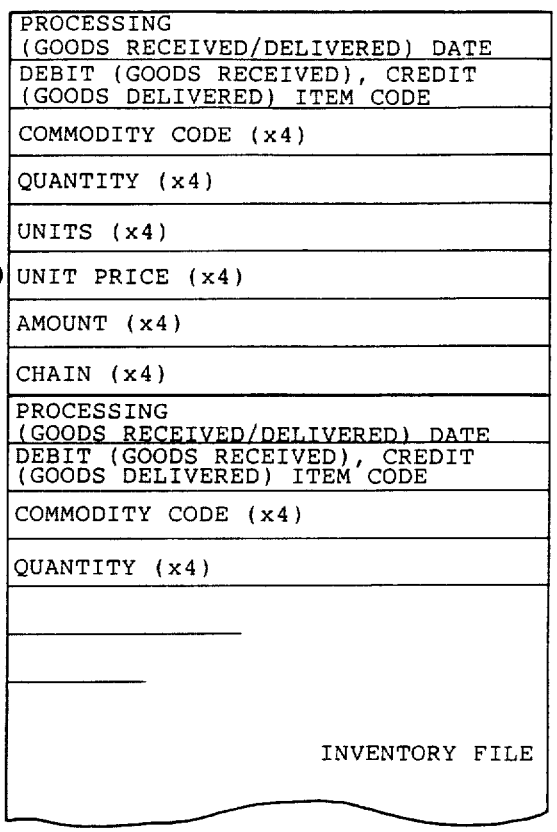

Fig.4b

| PROCESSING (GOODS RECEIVED/DELIVERED) DATE |
| --- |
| DEBIT (GOODS RECEIVED), CREDIT (GOODS DELIVERED) ITEM CODE |
| COMMODITY CODE (x4) |
| QUANTITY (x4) |
| UNITS (x4) |
| UNIT PRICE (x4) |
| AMOUNT (x4) |
| CHAIN (x4) |
| PROCESSING (GOODS RECEIVED/DELIVERED) DATE |
| DEBIT (GOODS RECEIVED), CREDIT (GOODS DELIVERED) ITEM CODE |
| COMMODITY CODE (x4) |
| QUANTITY (x4) |

INVENTORY FILE

| CONSTRUCTION NUMBER | ESTIMATE | AMOUNT ASKED | COST PRICE (12 MONTHS) |
| --- | --- | --- | --- |
|  |  |  |  |
|  |  |  |  |
|  |  |  |  |

TOTALS FILE

| CONSTRUC. NO. | NAME CODE | DATE | ITEM | WORK HOURS | WAGE | MIS'C |
| --- | --- | --- | --- | --- | --- | --- |
|  |  |  |  |  |  |  |
|  |  |  |  |  |  |  |
|  |  |  |  |  |  |  |

LABOR PARTICULARS FILE

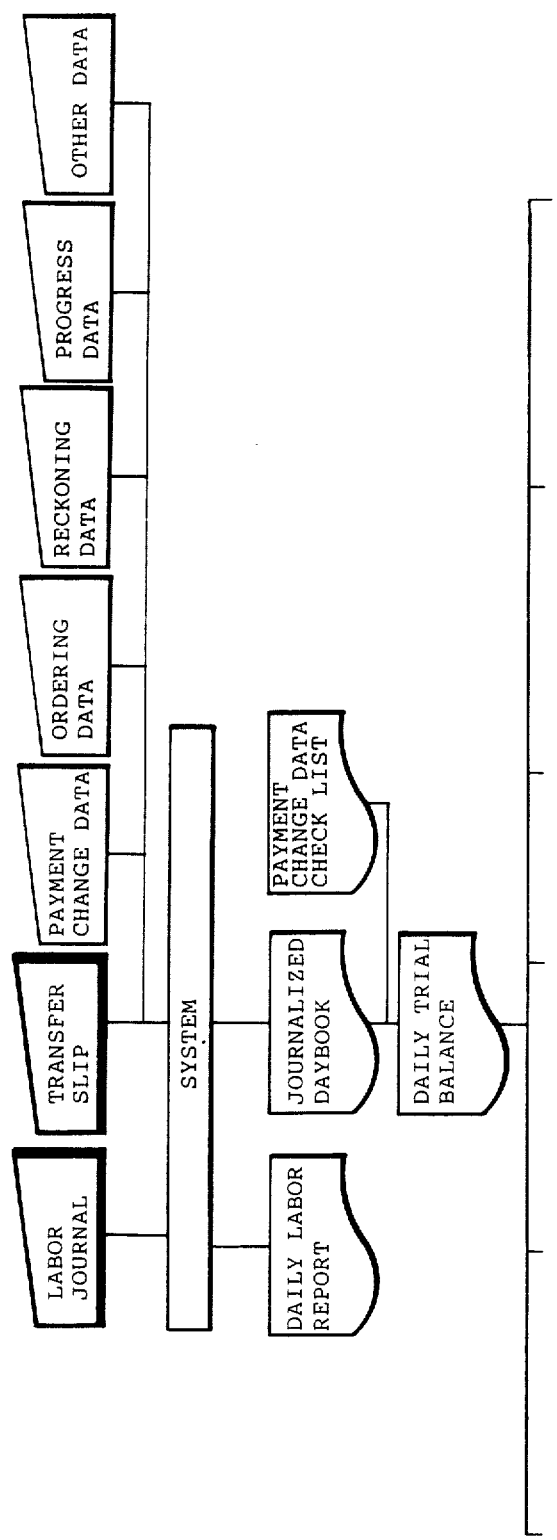

Fig.12

INVENTORY LIST

| PROCESSING DATE DAY: MONTH: YEAR: | | | | | | | | | |
|---|---|---|---|---|---|---|---|---|---|
| COMMODITY CODE | COMMODITY NAME | ARTICLE NUMBER | MATERIAL | GRADE | DIMENSIONS | NUMBER/ VOLUME PER PIECE | UNIT PRICE | TOTAL STOCK | INVENTORY MONEY AMOUNT |
|  |  |  |  |  |  |  |  |  |  |

Fig. 13

MONTHLY TRIAL BALANCE, BY SITE,
OF INCOMPLETE CONSTRUCTION EXPENSES

| PROCESSING DATE  DAY:  MONTH:  YEAR: | | |
|---|---|---|
| CONSTRUCTION NO.<br>CONSTRUCTION NAME | 60 - 51<br>XXXXXXX | 60 - 52<br>XXXXXXX |
| (MATERIAL EXPENSES)<br>STRUCTURE MATERIALS - LUMBER<br>STRUCTURE MATERIALS -<br>  NEW BUILDING MATERIALS<br>FURNISHINGS MATERIALS - LUMBER<br>FURNISHINGS MATERIALS -<br>  NEW BUILDING MATERIALS<br>OLD BUILDING MATERIALS<br>MIS'C<br>SUBTOTAL<br>CARRY-OVER FROM PREVIOUS MONTH<br>TOTAL<br>(EQUIPMENT COSTS)<br>GENERAL HOUSEHOLD GOODS<br>. . .<br><br>(CONSTRUCTION EXPENSES)<br>WELFARE EXPENSES<br>TRANSPORTATION EXPENSES<br>PACKING AND PRESERVATION EXPENSES<br>. . . | | |

GENERAL-PURPOSE MANAGEMENT SYSTEM

BACKGROUND OF THE INVENTION

1. Field of the Invention

This invention relates to a general-purpose management system for business management and administration including financial management, inventory management, personnel management and construction management in shops, offices and enterprises.

2. Description of the Prior Art

Business management and administration in shops, offices and enterprises take on a variety of forms. Owing to the present availability of small computers at a comparatively low cost, attempts are being made to implement management of the type described by using computer systems Some of these attempts have been partially successful. However, the conventional computer management systems are still functionally inadequate and not easy to use. The reason is that management is of a wide variety of types each of which is implemented individually.

Let us take an engineering firm as an example. In order for such a firm to do business, the types of management necessary include financial management such as the preparation of ledgers for payments, accounts payable and accounts not yet paid, cost accounting, profit-and-loss accounting and the preparation of statements of accounts; inventory management for ascertaining the amount of available stocks of materials and the like; construction management such as the preparation of written estimates, the making of entries in construction ledgers, totalization classified by construction site, the preparation of work progress tables classified by construction site and the preparation of lists classified by individual, department and site; and personnel management including the preparation of totals tables classified by individual and site. Despite the fact that these various management items are mutually related, each type of management is performed separately of the others in the prior art. For example, financial management is executed by the individual in charge of financial affairs, while inventory management is performed by the person in charge at the construction site or by the individual in charge of the purchase of materials. When materials have been acquired, the amount of stock of that material increases accordingly and results in an account that must be paid. Accordingly, the purchase of material is a basic factor resulting in a change that must be taken into account not only in inventory management but also in financial management. With the conventional computer management system, a change in one factor requires that an operator perform input processing two or more times. Moreover, there are many cases where the input format (the document used for making inputs)) differs for each and every management item. Accurate input processing in such a situation is impossible unless the operator is highly experienced.

SUMMARY OF THE INVENTION

An object of the present invention is to provide a general-purpose management system wherein basic data for management of a variety of types can be inputted using a document or format of a single type, and wherein management of any desired type can be realized using the inputted basic data.

According to the present invention, the foregoing object is attained by providing a general-purpose management system comprising: means for displaying a single general format on a display unit in order that items which are redundant in plural types of management to be performed independently, as well as items peculiar to each type of management, may be inputted successively; a first file for collectively storing data relating to each of said items inputted in accordance with the display; a plurality of second files for storing data necessary for each type of management on a type-by-type basis with regard to the plural types of management to be performed independently; means which, in dependence upon the type of management to be performed independently, is adapted to extract data necessary for this management from the first file and transfer the data to a corresponding one of the second files; and means for preparing data necessary for a specific type of management and outputting these data in accordance with a predetermined format on the basis of the data in the first file and the data transferred to the corresponding one of the second files.

In accordance with the invention, a single format is used for dealing with plural types of management, and all data necessary for these types of management can inputted in the single format. Since input formats are consolidated in the form of the single format, anyone can master the format quickly and perform the required input processing rapidly and accurately. Data that appear redundantly in plural types of management can be inputted in a single input operation, thus eliminating unnecessary input steps. After these collective input data are entered, they are stored for each type of management in a file conforming to the particular management type. This enables plural types of management to be performed individually. Furthermore, since management of a variety of types can be achieved by a single system, little installation space is required and hardware economy is improved.

These and other characterizing features of the present invention will become clear from a description of preferred embodiments with reference to the accompanying drawings.

BRIEF DESCRIPTION OF THE DRAWINGS

FIG. 1 is a block diagram illustrating the general hardware configuration of a general-purpose management system;

FIG. 2 is a view illustrating the format of a transfer a hard disc;

FIGS. 3a and 3b, are views depicting master files provided in a hard disc;

FIGS. 4a and 4b, are views illustrating examples of data files;

FIGS. 5a and 5b, are views showing the relationship among input/output, documents and ledgers;

FIG. 12 is a view showing an inventory list; and

FIG. 13, is a view showing a list of monthly totals, classified by site, of expenditures for incomplete construction projects.

DETAILED DESCRIPTION OF THE PREFERRED EMBODIMENT

Figure 5B:
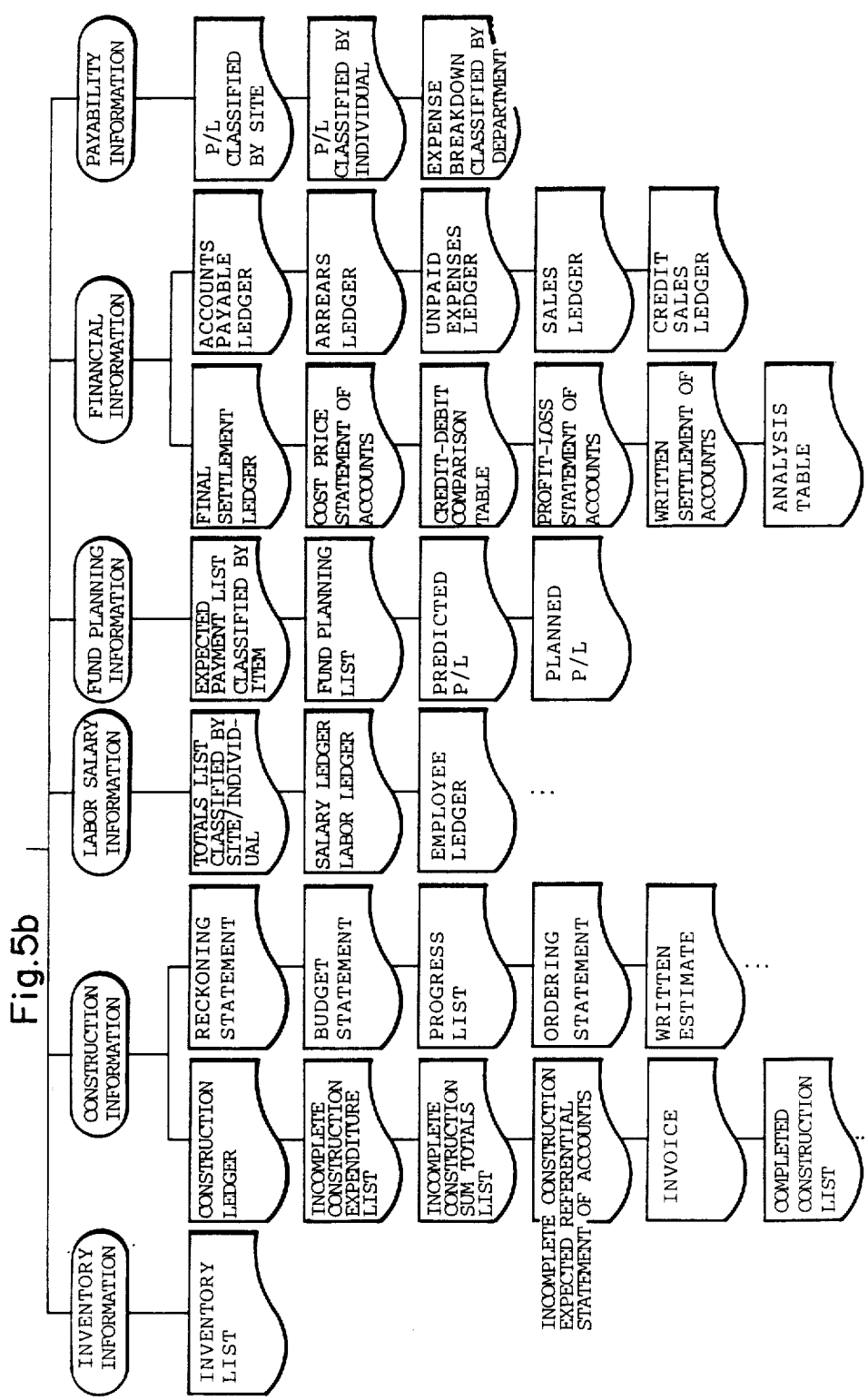

An embodiment of the present invention will be described in detail in accordance with the following Table of Contents:

TABLE OF CONTENTS (1) System hardware configuration
(2) Transfer slip
(3) Master files
(4) Data files
(5) Input/output documents and ledgers
(6) Input processing: processing for preparing transfer slips
(7) Output processing An embodiment will now be described in which the present invention is applied to financial, inventory, personnel and construction management in a construction engineering firm.

(1) System hardware configuration

FIG. 1 illustrates the hardware configuration of a general-purpose management system according to the present invention. The general-purpose management system includes a central processing unit (CPU) 1 at the core of the system. Though it is preferred that a personal computer be employed as the CPU 1, the device best suited to the scale of the management jobs and amount of data handled is selected. A keyboard 3 is connected to the CPU 1 as an input unit for inputting basic data required for each type of management as well as commands for outputting the desired ledgers. Connected to the CPU 1 as output units are a display 4, preferably a CRT, for displaying input and output data and the like, and a printer 5 for outputting the desired ledger. Also connected to the CPU 1 is a hard disc 2 for storing a general-purpose management program and data necessary for management. The data base stored on the hard disc 2 are master files and a data files. The master files include an item master, commodity master, outside order receiver master, construction master, construction location master, supervisor master, department master, docket master, supplier master and personnel master files. The data files include a journalized daybook, financial file (especially an accumulation of jouralized daybooks), a construction-related file, a labor particulars file and an inventory file.

(2) Transfer slips

In accordance with the invention, much data necessary for the abovementioned financial, inventory, labor and construction management are inputted using a single document or format (hereafter referred to as a transfer slip). The concept of transfer slip as used herein refers not only to a type of document that exists in physical, sheet-like form, such as paper or an object analogous thereto, but also includes a document of the kind presented in the form of an image on the screen of the display 4. Accordingly, in extreme cases, a document will not exist in paper form at all but will be expressed solely as an image on the display 4 when data are inputted.

FIG. 2 is a view illustrating the format of the transfer slip and shows the transfer slip as it appears displayed on the screen of the display 4.

The transfer slip has spaces for entering or inputting the following items:

PROCESSING DATE: This is the date the transfer slip was prepared or the date data were inputted using the transfer slip.

DEBIT ITEM CODE, DEBIT AUXILIARY CODE (DEBIT ITEM NAME), DEBIT AMOUNT, DOCKET, CREDIT ITEM, CREDIT AUXILIARY CODE (CREDIT ITEM NAME) and CREDIT AMOUNT: The "DEBIT ITEM" and "CREDIT ITEM" are terms that have the usual meaning in the field of double-entry bookkeeping. The "AUXILIARY CODE" is used when it is necessary to record the debit and credit items in greater detail. For example, a customer code or bank code could be used as an auxiliary code. The "DOCKET" is used, outside of the "DOCKET ITEMS" described below, when data necessary for financial processing exist. If the debit and credit item codes are inputted when the transfer slip is created on the screen of the display 4, the debit and credit names will be displayed automatically. The abovementioned items have long been known as input data in ordinary financial management systems.

[DOCKET ITEMS]CONSTRUCTION NO. (CONSTRUCTION NAME), CONSTRUCTION LOCATION CODE (CONSTRUCTION LOCATION), SUPERVISOR CODE (SUPERVISOR NAME), DIVISION CODE (DIVISION NAME), DEPARTMENT CODE (DEPARTMENT NAME), EXPECTED DATE OF PAYMENT, DUE DATE OF BILL RECEIVABLE and DUE DATE OF BILL OF PAYMENT: The "CONSTRUCTION NUMBER" and "CONSTRUCTION NAME" have one-on-one correspondence and specify the construction job requested of the engineering firm at which this system is installed. The "CONSTRUCTION LOCATION" is the construction site. "SUPERVISOR" indicates the supervisor of the abovementioned construction or the person in charge of matters relating to data recorded on the transfer slip. "DIVISION" relates to the category of each type of expense. For example, one of the following codes would be entered here: "1"(material expenses), "2"(facilities expenses), "3"(outside order expenses), "4"(labor expenses) and "5"(construction expenses) (where the numerals "1" through "5" are the division codes). "DEPARTMENT" means the post the abovementioned supervisor holds in the engineering firm. Examples are: "1"(construction department), "2"(business department) and "3"(administration department). The "EXPECTED DATE OF PAYMENT", "DUE DATE OF BILL RECEIVABLE" and "DUE DATE OF BILL OF PAYMENT" have the accepted ordinary meanings as used in finance or commerce.

When the operator inputs the codes corresponding to the construction name, construction location, supervisor name, division name and department name while viewing the screen of the display 4, the names automatically appear on the display screen.

COMMODITY CODE (COMMODITY NAME), QUANTITY, UNITS, UNIT PRICE and AMOUNT: These data are required mainly in inventory management and relate to the commodities (including materials) handled by the engineering firm. In the illustrated embodiment, it is possible to input data relating to four types of commodities by using a single transfer slip, though it goes without saying that any desired number can be inputted. Since the name of the commodity is displayed automatically by inputting the commodity code, it is unnecessary to input the name of the commodity by using the keyboard 3.

In all cases where, it is necessary to input data, such as when there is a receipt or payment of money or a receipt or delivery of commodities and materials, a transfer slip of the above kind is prepared and fed into the system.

(3) Master files

FIGS. 3a and 3b illustrate master files provided in the hard disc 2.

An item master file stores data necessary for management processing in a form corresponding to each item code for a large number of items. These data include item names, debit and credit division, totals division, amount carried over from the last account (beginning balance), current month debit amount, current month credit amount, starting addresses and end addresses. The item name data are a collection of character codes forming item names to be displayed on the display 4 and printed out by the printer 5. The debit and credit division data indicate whether the item is a debit item or credit item. The totals division data are necessary in totalization processing for financial affairs and indicate whether the item is classified as e.g. an asset, expense or liability. The current month debit amount and current month credit amount mean the total of these amounts each month. The storage locations for these have a capacity capable of storing a 12-month amount on a month-by-month basis. Each time transfer slip data are inputted, the amount inputted is added to the debit amount and/or credit amount of the month having the day on which the input processing was executed, whereby the amount is updated. The amount carried over from the last account is the balance of the preceding month and is updated every month. The starting and end addresses will be described below.

The commodity master file stores data necessary for management processing in a form corresponding to each commodity code for a large number of commodities. These data include, in addition to commodity names serving as display and print data, specifications, dimensions, units, cost prices, list prices, preceding month total stock, present month quantity of commodities received, present month quantity of commodities delivered, starting addresses and end addresses. The storage locations for the quantities of commodities received and delivered the present month have a 12-month capacity. Each time data relating to receipt and delivery of commodities or material are inputted using the transfer slip, the quantity of commodities or material received and delivered the present month is added to the present month quantity of commodities or material received and delivered of the month having the day on which the input processing was executed, whereby the quantity received and delivered is updated. The preceding month total stock is updated every month.

The outside-order receiver master file stores character codes for displaying and printing the names of outside order receivers in a form corresponding to each outside order receiver code for a large number of outside order receivers.

Similarly, the supervisor master file stores, for each and every supervisor code, supervisor name data as well as the code of the department to which supervisor belongs. Since this file stores the department codes in a form corresponding to the supervisor codes, inputting a supervisor code when the transfer slip is prepared will cause the department code and the department name to be displayed on the display 4 automatically together with the name of the supervisor without requiring that the department code be inputted.

Though a construction location master file, outline master file and a supplier master file are not illustrated, these master files store, in correspondence with name codes, the relevant display and printing data in a manner similar to the outside order master file.

A construction master file registers basic construction information, such as construction number, construction name, contract number, benefactor, construction location and contract date, when a construction job is generated.

A personnel master file is a basic file relating to labor and is for registering basic information regarding the name, address, date of employment and wages of employees and the like. The personnel master file includes a salary itemization file. The latter stores, in correspondence with each employee name code, one year of attendance data for calculating monthly wages.

(4) Data files

FIGS. 4a and 4b illustrate examples of data files provided in the hard disc 2.

A journalized daybook file stores raw data not yet processed and has a large number of storage locations for storing, for each and every transfer slip, raw data inputted by the transfer slip. Since debit and credit item names, construction names, construction locations, supervisor names, division names, department names commodity names and the like can be understood by their codes, these are not stored in this file as a matter of course.

A file of accumulated journalized daybooks stores, for each and every transfer slip, data relating mainly to financial management processing from among the data in the journalized daybook file. Also stored at the location of each item of data is a chain address. The chain address is described below.

A financial affairs file stores, for each and every transfer slip, data relating mainly to inventory management processing from amount the data in the journalized daybook file. This file also has a chain address attached to each item of data.

A construction-related file includes a construction totals file, construction progress file, reckoning (estimate) file, budget file and the like. Among these, a portion of the construction totals file is shown in FIG. 4b. This file stores, for each and every construction number, an estimate, amount asked and cost price (January through December) relating to each construction job, after these have been reckoned. These data are created by being extracted from the journalized daybook file, totaled and added in output processing, described below. The progress file is for progress management and stores the term of a construction work classified according to construction location (site). The reckoning file stores reckoning (estimate) data inputted for each construction location. The budget file stores budget data inputted for each storage location.

The labor particulars file stores data inputted from a labor journal, described below. These stored data include construction numbers, worker name codes, dates, items, work hours, wages and the like.

(5) Input and output documents and account ledgers

FIGS. 5a, 5b illustrate input documents and account ledgers as well as an output account ledger. Most of the data necessary for the various types of management are inputted using the above-described transfer slips. A labor journal and other documents and account books are used in a supplementary manner. It will be appreciated from the drawings that a large variety of output account ledgers and tables are obtained. It is possible to classify these into inventory information, construction information, labor and wage information, fund planning information, financial information, payability information and the like.

Let us now discuss some input processing steps using these input documents and the like, as well as output processing steps for outputting some of these account ledgers and the like from among the output account ledgers.

(6) Input processing: processing for preparing transfer slips

Figure 6:
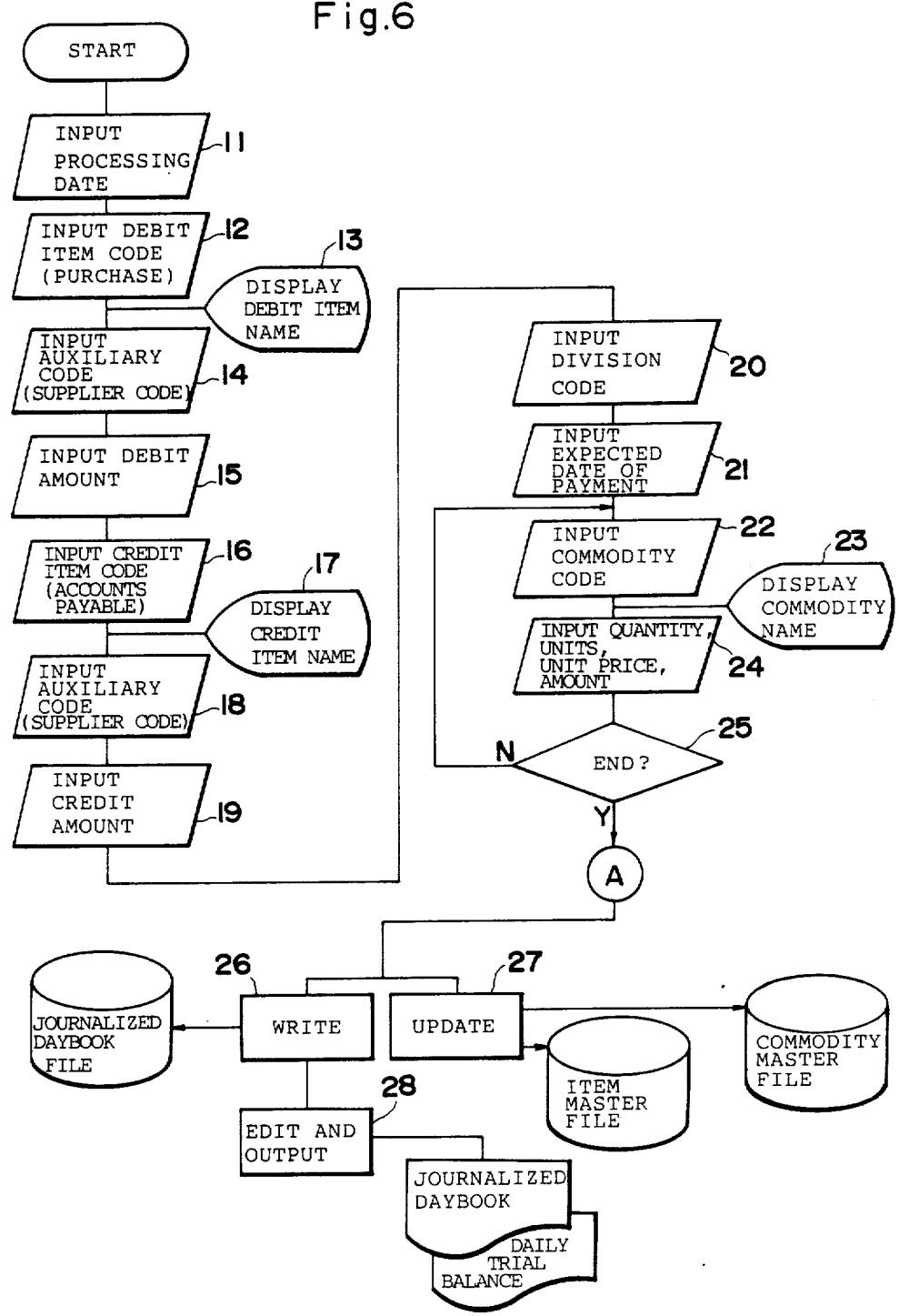
FIG. 6 is a flowchart illustrating an example of processing (for transfer slip preparation) for inputting relevant data when goods are received.

FIG. 6 illustrates processing for inputting data relating to the receipt of materials or commodities for when such goods are received, or in other words, processing for preparing a transfer slip, which relates to the receipt of material, on the screen of the display 4. In order to facilitate an understanding of the invention, the flowchart includes both processing executed by the CPU 1 and operations performed by the operator.

Upon viewing a menu which appears on the display 4, the operator selects "TRANSFER SLIP INPUT PROCESSING" to initiate processing. This causes the transfer slip format shown in FIG. 2 to be displayed on the screen of the display 4, with a cursor appearing at the position of the processing date. The operator responds by inputting the date of that day from the keyboard 3, at shown at step 11 of the flowchart. Next, the cursor shifts to the position of the debit item code and the operator inputs the code of the item "PURCHASE" at a step 12, whereupon the CPU 1 refers to the item master file, reads a character code representing the inputted item code out of the same file and causes the characters "PURCHASE" to be displayed in the blank space below the debit item name on the display 4 on the basis of the character code read. This occurs at step 13 of the flowchart. Thereafter, the cursor shifts to the position of the auxiliary code. The operator responds by inputting a code representing the supplier as an auxiliary code at a step 14. Next, a step 15 calls for the operator to input the sum total of one or plural materials or commodities as a debit amount.

The operator skips the docket item and, at a step 16, inputs a credit item code representing "ACCOUNTS PAYABLE". The CPU 1 refers to the item master file and causes a credit item name referring to "ACCOUNTS PAYABLE" to be displayed at a step 17. The operator then inputs the supplier name code as an auxiliary code and an amount, which is the same as the above-mentioned debit amount, as a credit amount, at steps 18, 19, respectively.

If the debit item is a purchase and the credit item is an account payable, then it is determined by the program that a transfer slip is to be prepared for receipt of materials or a commodity. In such case, inputs of a construction number, construction location code and supervisor code are unnecessary and, hence, these blank spaces on the display screen are skipped automatically, so that the cursor shifts to the position of the division code. Now the operator inputs "1"(material expense) as the division code at a step 20. The department code position is skipped for the reason set forth above. The operator then inputs the expected payment date at a step 21. The items for the due date of bills receivable and the due date of bills of payment are skipped.

When the code of the received material or commodity is inputted at a step 22, the material or commodity name is displayed at a step 23. The operator then inputs the quantity of the material or commodity, the units, unit price and amount of money at a step 24. In the case of plural types of commodities or materials, the input operations and processing of steps 22–24 are repeated. If the operator presses a key to indicate that he is finished (step 25), the program proceeds to the next type of processing.

On the one hand, the transfer slip data inputted as set forth above are written into the transaction daybook file at a step 26. If the operator commands output of the journalized daybook, the data that have been written into the journalized daybook file are printed out (step 28) by the printer 5 in a format almost the same as that shown in FIG. 2. In addition, the debit and credit totals are summed successively at the time of output processing and the total of the debits and credits is eventually printed out. If necessary, an edited, totalized daily trial balance is printed in which all of the transfer slip data inputted on that day appear in the form of a list (see FIGS. 5a and 5b).

On the other hand, processing for updating the data in the item master file and commodity master file is executed at a step 27. In the item master file, the amount of money associated with the item is added to that month's debit and credit amounts for the item of the inputted transfer slip. In the commodity master file, the quantity of the goods just received (or the quantity of the goods just delivered in a case where a material or commodity has been delivered to the site) is added to that month's received quantity of the commodity on the inputted transfer slip (or that month's delivered quantity of the goods) on the inputted transfer slip.

A transfer slip is also prepared when materials or commodities are delivered to the site. Though the processing is not illustrated, the necessary data are inputted through the following procedure:

First, the operator inputs the processing date and then the code of an item "INCOMPLETE CONSTRUCTION DISBURSEMENT" as the debit item code. An input of the debit auxiliary code is unnecessary. The operator also inputs the total sum of the materials or commodities delivered as the debit amount. Next, the operator inputs a credit item code "MATERIAL" (or "COMMODITY") as well as the credit amount.

In the "OUTLINE ITEMS" section, the operator inputs the construction number, construction location code and division ("1", which stands for material expenses).

Finally, the operator inputs the code, quantity, units, unit price and money amount of the delivered material or commodity for each type of material or commodity.

When the transfer slip has been prepared in the manner described above, processing for writing the data into the journalized daybook file and processing for updating the item master file and commodity master file are executing just as in steps 26 and 27 of FIG. 6. If necessary, processing for outputting the journalized daybook and daily trial balance is executed in response to an input commanding such processing.

Figure 7:
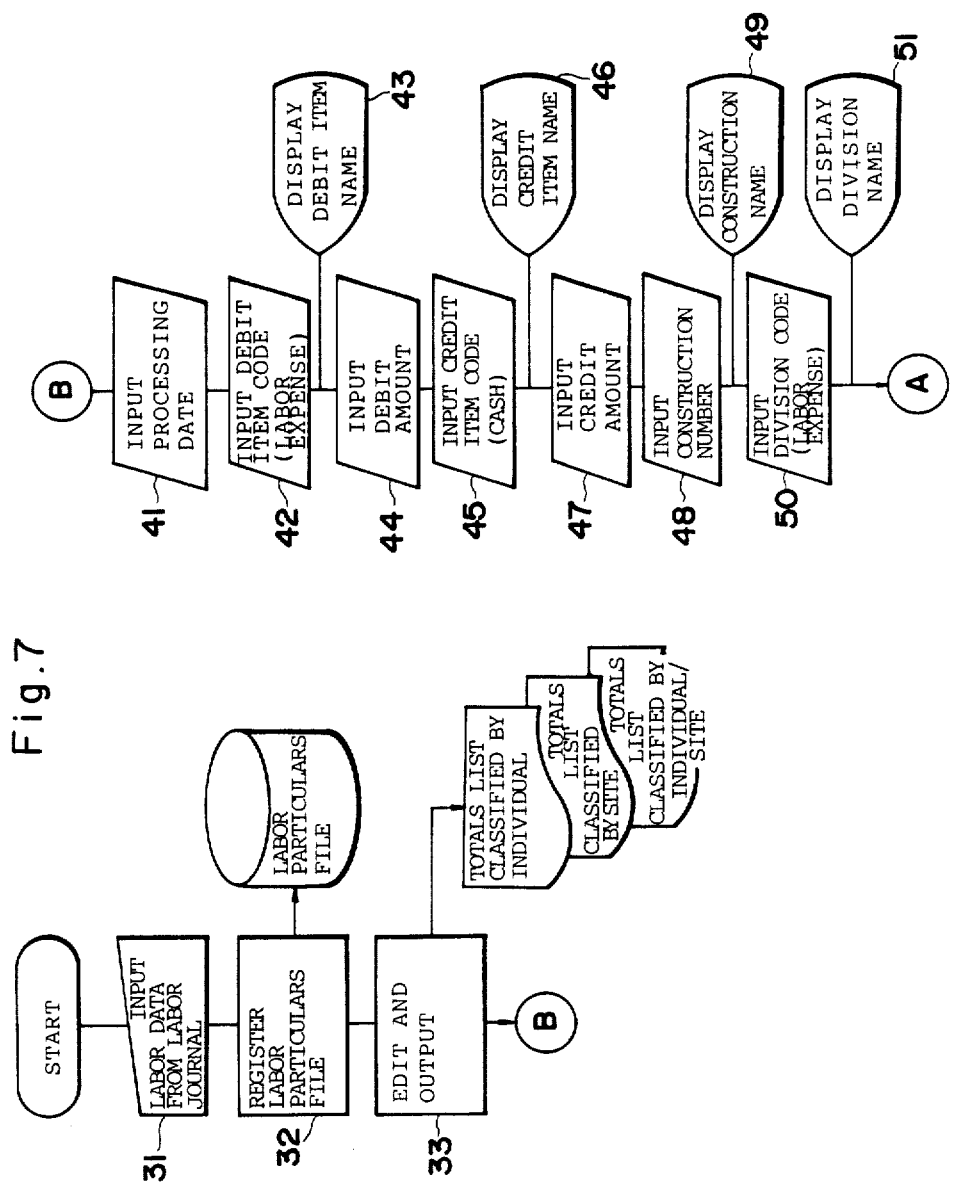
FIG. 7 is a flowchart illustrating an example of processing for inputting data relating to labor expenses.

FIG. 7 illustrates a processing procedure relating to labor expenses. Input processing relating to labor expenses comprises preliminary processing for preparing a transfer slip and transfer slip preparation processing.

For every construction name (construction number) and construction location (construction location code), the work hours (actual work hours) and time wages of workers (inclusive of the supervisor) engaged at the site are recorded in the labor journal. In the preliminary processing mentioned above, the operator refers to the labor journal and, using the keyboard 3, inputs the date, construction number, construction location code, work hours and time wages for every worker (name code). This is step 31 of the flowchart shown in FIG. 7. The wage of the worker is calculated based on the inputted data and both the wage data and inputted data are registered in the labor particulars file at a step 32. These process steps are performed for all workers written in the labor journal.

If this is followed by inputting an output command, the printer 5 will respond by printing out a totals list classified by individual, and a totals list classified by site and/or a totals list classified by individual and site. For example, a totals list classified by individual would be prepared by extracting the worker data regarding one and the same worker from the labor particulars file and calculating totals of work hours and wages for that worker.

A transfer slip is created by referring to each labor totals list thus outputted. Assume that labor expenses are paid in cash. A transfer slip is prepared for every construction number (construction name). First, the operator inputs the processing date at a step 41. When a code representing "LABOR EXPENSE" is inputted as the debit code at a step 42, "LABOR EXPENSE" is displayed in the blank space left for the debit item at a step 43. Next, the operator inputs the total sum of wages (debit amount) to be paid for the present day for the construction (number) which is the object of transfer slip preparation (step 44).

When the operator inputs a code representing "CASH" as the credit code at a step 45, the name of the credit item is displayed at a step 46. This is followed by a step 47, at which the operator inputs a credit amount, which is the same as the debit amount. In this case it is not necessary to input the debit auxiliary and credit auxiliary codes.

In the "DOCKET ITEMS" section, the operator inputs the construction number, whereupon the construction job name corresponding thereto is displayed (steps 48, 49). Since "4", indicating labor expense, is inputted as the division, the division name "LABOR EXPENSE" is displayed (steps 50, 51). The other items do not require inputs. It is also unnecessary to input data relating to commodities.

The foregoing completes the preparation of the transfer slip. Thereafter, as already described in connection with FIG. 6, processing for writing the slip into the journalized daybook file (step 26), processing for outputting journalized daybook (if necessary) (step 28), and processing for updating the item master file (step 27) are executed. Since there are no data relating to commodities, updating the commodity master file is not required.

Material expenses, outside-order expenses and other expenses incidental to construction that does not involve receipt or delivery are inputted using a transfer slip in almost the same manner as that described above. If calculation of proceeds and expenses per supervisor is necessary, it goes without saying that the supervisor code is inputted.

(7) Output processing

The output processing described here includes sorting processing by journalized daybook file date, updating processing for the inventory file, accumulated transaction daybook file and totals file, and output (printing) processing for outputting an inventory list, a final settlement ledger and the other documents and ledgers shown in FIGS. 5a and 5b. The sorting processing and updating processing (exclusive of the totals file) preferably are performed on a regular basis, e.g. daily. It is also preferred that such processing be executed by the CPU 1 in accordance with the program regularly or at appropriate open times without waiting for an instruction from the operator. Printing processing naturally is performed in response to an instruction inputted at the keyboard 3 by the operator. The operator may do this at any time.

Sorting processing by date entails rearranging the data for each transfer slip, stored in the transaction daybook file, in order of the processing date. The sorting technique, though itself well-known in the art, will now be described in brief. Specifically, sorting processing includes reading processing dates and transfer slip identification numbers in the journalized daybook file into a working area of a memory and rearranging the processing dates so that they will be in order. In accordance with the order of the rearranged dates and by using the identification numbers as a key, the data for each transfer slip in the journalized daybook file are transferred successively from the old area of the file to a new area of the file.

Inventory file updating processing involves transferring data necessary for inventory management from the journalized daybook file to the inventory file after the journalized daybook file has been sorted according to date, and executing chaining processing. Chaining makes it possible to assign locations as preparation for rapid creation and outputting of an inventory list, described below.

Figure 9:
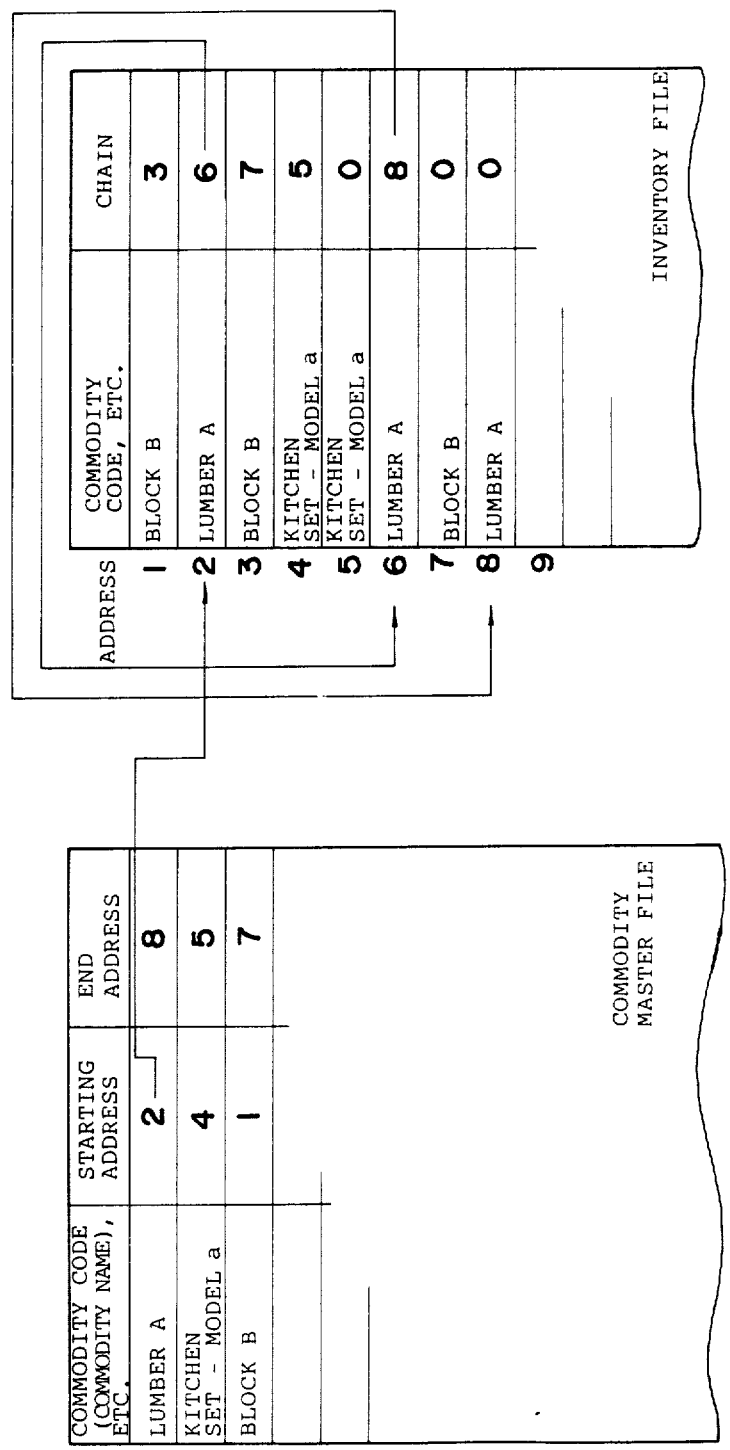
FIGS. 9 and 10 are views useful in describing the chaining of a file.

FIG. 9 illustrates portions of the commodity master file and inventory file extracted in order to describe chain processing. A chain indicates, for each commodity code (commodity name) in the commodity file, where (at what address) an item of inventory data (for goods received or delivered) relating to a commodity code is stored in the inventory file. For example, in the commodity master file, "2" is stored as a starting address and "8" as an end address at a storage location for a commodity code (commodity name) "LUMBER A". If, in accordance with the starting address "2", the storage location having the same address "2" in the inventory file is observed, receipt/delivery data relating to the same commodity code ("LUMBER A") will be found to have been stored at this address along with a chain "6". If, in accordance with the chain "6", the storage location at address "6" in the inventory file is observed, different receipt/delivery data relating to the same commodity code ("LUMBER A") will be found to have been stored together with a chain "8". Similarly, if the storage location at address 8 in the inventory file is observed, other receipt/delivery data relating to the same commodity code ("LUMBER A") will be found to have been stored, with "0" having been set as the chain. The chain "0" means that the chain ends here, namely that inventory data relating to the same commodity code ("LUMBER A") does not exist after this address. In the commodity master file, therefore, "8" is stored as the end address of the commodity code (commodity name) "LUMBER A" storage location.

Figure 8:
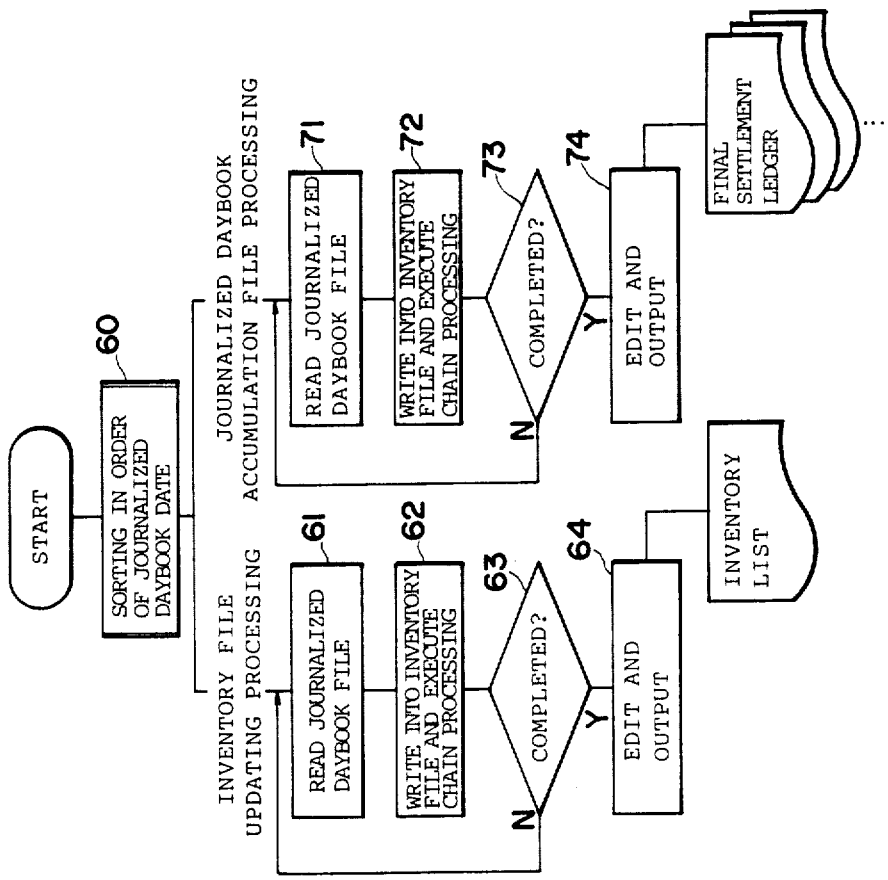
FIG. 8 is a flowchart illustrating an example of data output processing.

In inventory file updating processing, as shown in FIG. 8, the first step (step 61) is to read data relating to one transfer slip out of the journalized daybook file and, from among these data, transfer data relating to inventory (receipts and deliveries) to a storage location in the inventory file at which inventory data have not yet been written and, moreover, which has the lowest numbered address (e.g. address "9" in FIG. 9). Chain processing for producing these results is executed at a step 62. Through chain processing, the end address (e.g. "8" for "LUMBER A") of the commodity code in the commodity master file is read out, the address (e.g. "9") of the location storing the new inventory data is stored in place of the chain data "0" at the address "8" in the inventory file, and "0" is written as the chain in the storage location at address "9". Then, "9" is stored in place of the end address "8" of this commodity in the commodity master file.

The above processing is performed repeatedly for all of the transfer slip data in the journalized daybook file (step 63).

Figure 10:
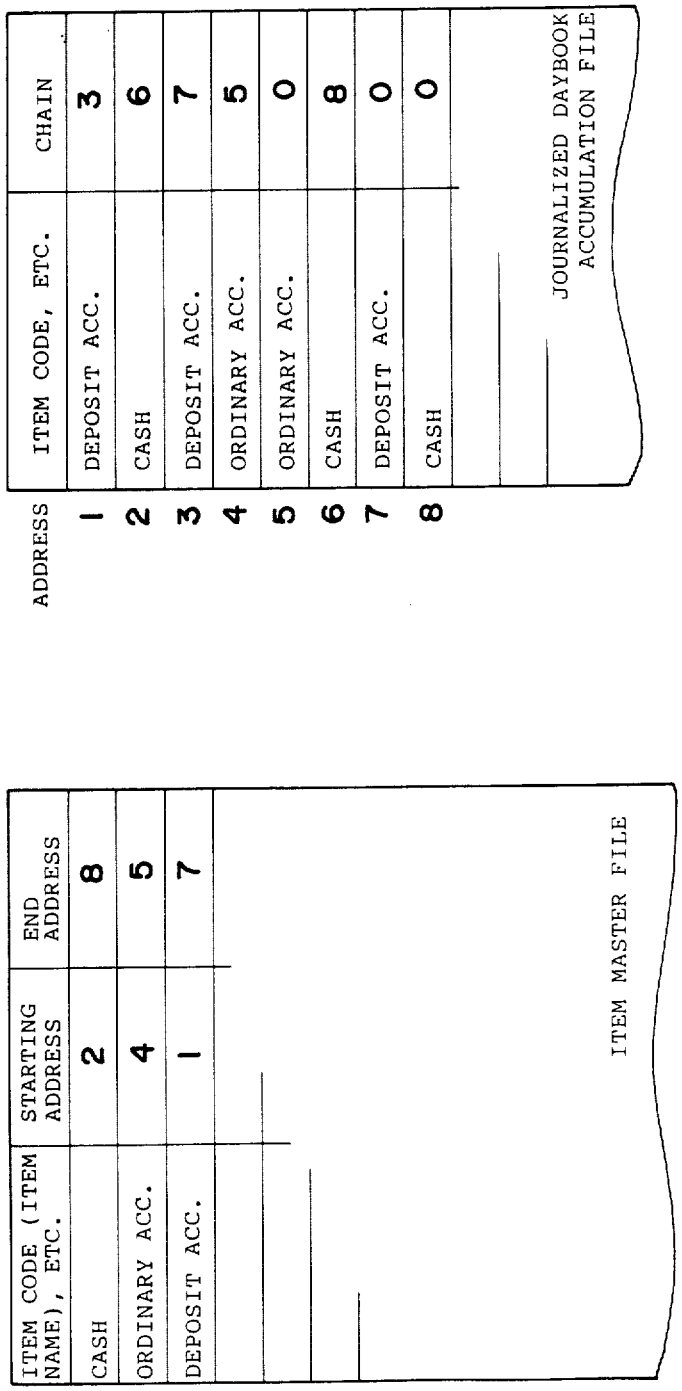

Processing for updating the journalized daybook accumulation file is performed through a procedure entirely the same as the above-described processing for updating the inventory file (steps 71-73). Here data relating to finances in the journalized daybook file, and not data relating to inventory, are transferred to the journalized daybook accumulation file. Chaining is performed in a similar manner in order to effect processing for outputting a final settlement ledger. FIG. 10 illustrates an example of chaining relating to cash as an item.

When a command for outputting an inventory list is inputting by the operator by using the keyboard 3, data relating to an inventory list of the kind shown in FIG. 12 are read out of the inventory file by referring to the chains of the commodity master file and inventory file. These data are edited and then printed out by the pringer 5 (step 64).

Similarly, when a command for outputting a final settlement ledger is inputted, a final settlement ledger is prepared from the data in the item master file and journalized daybook accumulation file, and the ledger is printer out (step 74).

Figure 11:
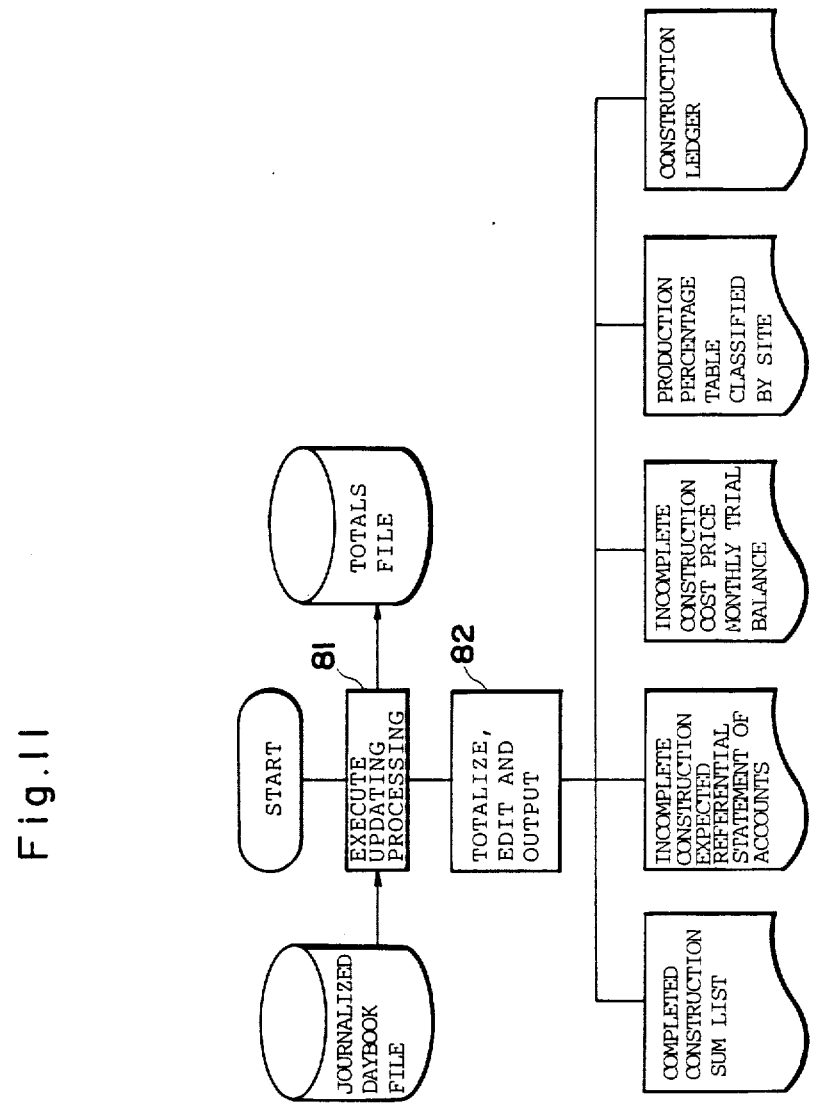
FIG. 11 is a flowchart illustrating processing for outputting data relating to construction.

FIG. 11 illustrates an example of output processing relating to construction. Here processing for updating the totals file is executed. Specifically, data which include the construction numbers in the journalized daybook file are retrieved, the amount asked and the cost price, etc., are added for each and every construction number, and the data indicative of the construction numbers in the totals file are updated by using the results of the addition operation. The sum total of material expenses, outside order expenses and labor expenses exclusive of extraneous outlays is the cost price.

When an instruction for preparing a desired ledger or list has been issued, all of the data in the journalized daybook file are searched in accordance with the instruction, the relevant data are picked out, totalized (if necessary), edited in the prescribed format and then printed out by the printer 5. For example, when an instruction is given to prepare a monthly trial balance, classified by site, of incomplete construction expenses, expenditures for one and the same construction number are extracted from the journalized daybook file and totalized over a division and specified items in the division to prepare a monthly trial balance of the kind shown in FIG. 13.

As many apparently widely different embodiments of the present invention can be made without departing from the spirit and scope thereof, it is to be understood that the invention is not limited to the specific embodiments thereof except as defined in the appended claims.

What is claimed is:

1. A general-purpose management system comprising:
    means for displaying a single general format on a display unit in order that items relating to at least a debit item, a credit item and a commodity item may be inputted successively for plural types of independent management including at least financial management and inventory management;
    a first file for collectively storing data relating to each of said items inputted in accordance with the display;
    a plurality of second files, including at least a file relating to financial data and a file relating to inventory data, for storing data necessary for each type of management on a management type-by-type basis with regard to the plural types of independent management including said financial management and inventory management;
    data transfer means which, in dependence upon the type of management to be performed independently, is adapted to extract data necessary for at least financial management and inventory management from said first file and transfer the data to a corresponding one of said second files including said file relating to financial data and file relating to inventory data; and
    means for preparing data necessary for a specific type of management and outputting these data in accordance with a predetermined format on the basis of the data in said first file and the data transferred to the corresponding one of said second files.

2. The system as claimed in claim 1, wherein said plural types of management further include labor management and construction management.

3. The system as claimed in claim 2, wherein said first file is a journalized daybook file, and said second files include an item master file and a financial file for financial management, a commodity master file and an inventory file for inventory management, a labor particulars file for labor management, and a construction-related file for construction management.

4. The system as claimed in claim 2, wherein said data transfer means subjects prescribed data extracted from said first file to processing.

5. The system of claim 1, including a transfer slip for writing in or for inputting to a computer said items, said transfer slip comprising:
    a data section;
    an accounts section including data relating to a debit item, a debit amount, a credit item and a credit amount;
    a docket section including itemization data for classifying various types of expense; and
    a commodity section including commodity codes and data relating to commodity quantity and commodity money amount.

6. The system of claim 5, wherein said transfer slip further includes data relating to construction.

* * * * *

(12) REEXAMINATION CERTIFICATE (4682nd)

United States Patent
Moriyama

(10) Number: US 4,851,999 C1
(45) Certificate Issued: Dec. 17, 2002

(54) GENERAL-PURPOSE MANAGEMENT SYSTEM

(75) Inventor: Teruko Moriyama, Kurashiki (JP)

(73) Assignee: Kanie Puropan, Inc., Suzuka (JP)

Reexamination Request:
No. 90/006,017, May 25, 2001

Reexamination Certificate for:
Patent No.: 4,851,999
Issued: Jul. 25, 1989
Appl. No.: 06/888,399
Filed: Jul. 23, 1986

(30) Foreign Application Priority Data

Jul. 24, 1985 (JP) .......................................... 60-162033

(51) Int. Cl.$^7$ ............................................... G06F 17/60
(52) U.S. Cl. .............................. 705/30; 705/1; 700/90; 707/104.1; 707/200
(58) Field of Search ........................... 705/7–10, 1, 30, 705/32, 28, 29; 700/90; 707/200, 104.1

(56) References Cited

U.S. PATENT DOCUMENTS 4,843,548 A * 6/1989 Carpenter ..................... 705/30

FOREIGN PATENT DOCUMENTS

JP            62-15066       * 1/1987 ................... 705/30

OTHER PUBLICATIONS

Sho. 58–37761, published Mar. 5, 1983, with English translation.

Fujii, "Office Computer Utilization Handbook", published Aug. 24, 1976, pp. 341–342, with English translation.

* cited by examiner

*Primary Examiner*—Richard E. Chilcot, Jr.

(57) ABSTRACT

A general-purpose management system displays a single general format on a display unit so that items redundant in plural types of management to be performed independently, as well as items peculiar to each type of management, can be inputted successively, and includes a first file for collectively storing data relating to each of the items inputted in accordance with the display, a plurality of second files for storing data necessary for each type of management on a type-by-type basis, a data extractor which, in dependence upon the type of management to be performed independently, is adapted to extract data necessary for this management from the first file and transfer the data to a corresponding second file, and a data preparer for preparing data necessary for a specific type of management and outputting these data in accordance with a predetermined format on the basis of the data in the first file and the data transferred to the corresponding second file.

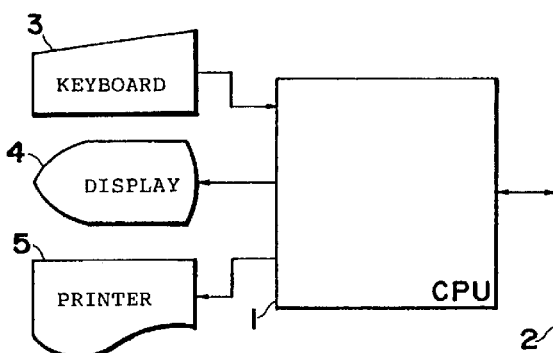

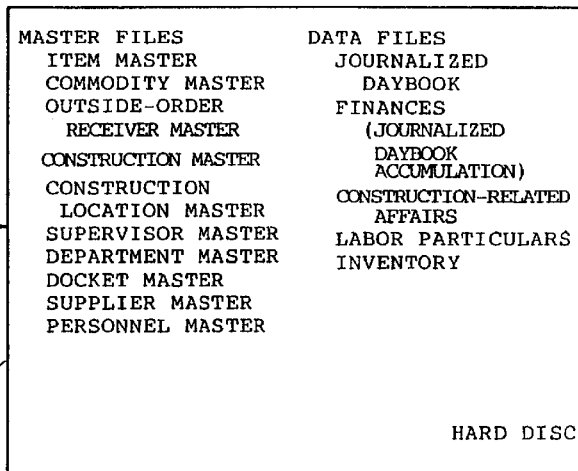

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–6 is confirmed.

* * * * *